(12) United States Patent
Dusik

(10) Patent No.: US 10,854,201 B2
(45) Date of Patent: Dec. 1, 2020

(54) VOICE CONTROL FOR A VEHICLE

(71) Applicant: Audi AG, Ingolstadt (DE)

(72) Inventor: Jan Dusik, Ingolstadt (DE)

(73) Assignee: Audi AG, Ingolstadt (DE)

( * ) Notice: Subject to any disclaimer, the term of this patent is extended or adjusted under 35 U.S.C. 154(b) by 98 days.

(21) Appl. No.: 16/169,647

(22) Filed: Oct. 24, 2018

(65) Prior Publication Data

US 2019/0139546 A1    May 9, 2019

(30) Foreign Application Priority Data

Nov. 6, 2017   (DE) .................... 10 2017 219 616

(51) Int. Cl.
| | |
|---|---|
| *G10L 15/00* | (2013.01) |
| *G10L 15/22* | (2006.01) |
| *G10L 15/26* | (2006.01) |
| *B60K 37/06* | (2006.01) |
| *B60K 35/00* | (2006.01) |
| *B60R 11/02* | (2006.01) |
| *G06F 3/16* | (2006.01) |
| *G10L 15/08* | (2006.01) |

(52) U.S. Cl.
CPC .............. *G10L 15/22* (2013.01); *B60K 35/00* (2013.01); *B60K 37/06* (2013.01); *B60R 11/0247* (2013.01); *G06F 3/167* (2013.01); *G10L 15/08* (2013.01); *G10L 15/26* (2013.01); *B60K 2370/148* (2019.05); *G10L 2015/088* (2013.01); *G10L 2015/223* (2013.01)

(58) Field of Classification Search
CPC ........ G10L 15/06; G10L 15/265; G10L 15/22
See application file for complete search history.

(56) References Cited

U.S. PATENT DOCUMENTS

| | | | |
|---|---|---|---|
| 9,476,718 B2 | 10/2016 | Herforth | |
| 2006/0100856 A1* | 5/2006 | Kang | ...................... G06F 40/49 704/9 |
| 2007/0256027 A1 | 11/2007 | Daude | |
| 2008/0208589 A1 | 8/2008 | Cross et al. | |
| 2010/0185445 A1* | 7/2010 | Comerford | ............. G10L 15/06 704/251 |
| 2013/0253929 A1* | 9/2013 | Weider | ..................... G10L 15/22 704/235 |
| 2017/0174230 A1* | 6/2017 | Goldman-Shenhar | ....................... B60K 35/00 |
| 2019/0057703 A1* | 2/2019 | Zeinstra | .................. G10L 17/00 |

FOREIGN PATENT DOCUMENTS

| | | |
|---|---|---|
| DE | 10360655 A1 | 7/2005 |
| DE | 102009018590 A1 | 10/2010 |
| DE | 102013219649 A1 | 4/2015 |
| DE | 102016008862 A1 | 1/2018 |

\* cited by examiner

*Primary Examiner* — Daniel Abebe
(74) *Attorney, Agent, or Firm* — Sterne, Kessler, Goldstein & Fox P.L.L.C.

(57) ABSTRACT

The disclosure relates to a human-machine interface (HMI) for a vehicle having a microphone for registering a command word spoken by a driver or further occupant of the vehicle and a control unit, which has a speech recognition module for recognizing multiple specific command words.

9 Claims, 1 Drawing Sheet

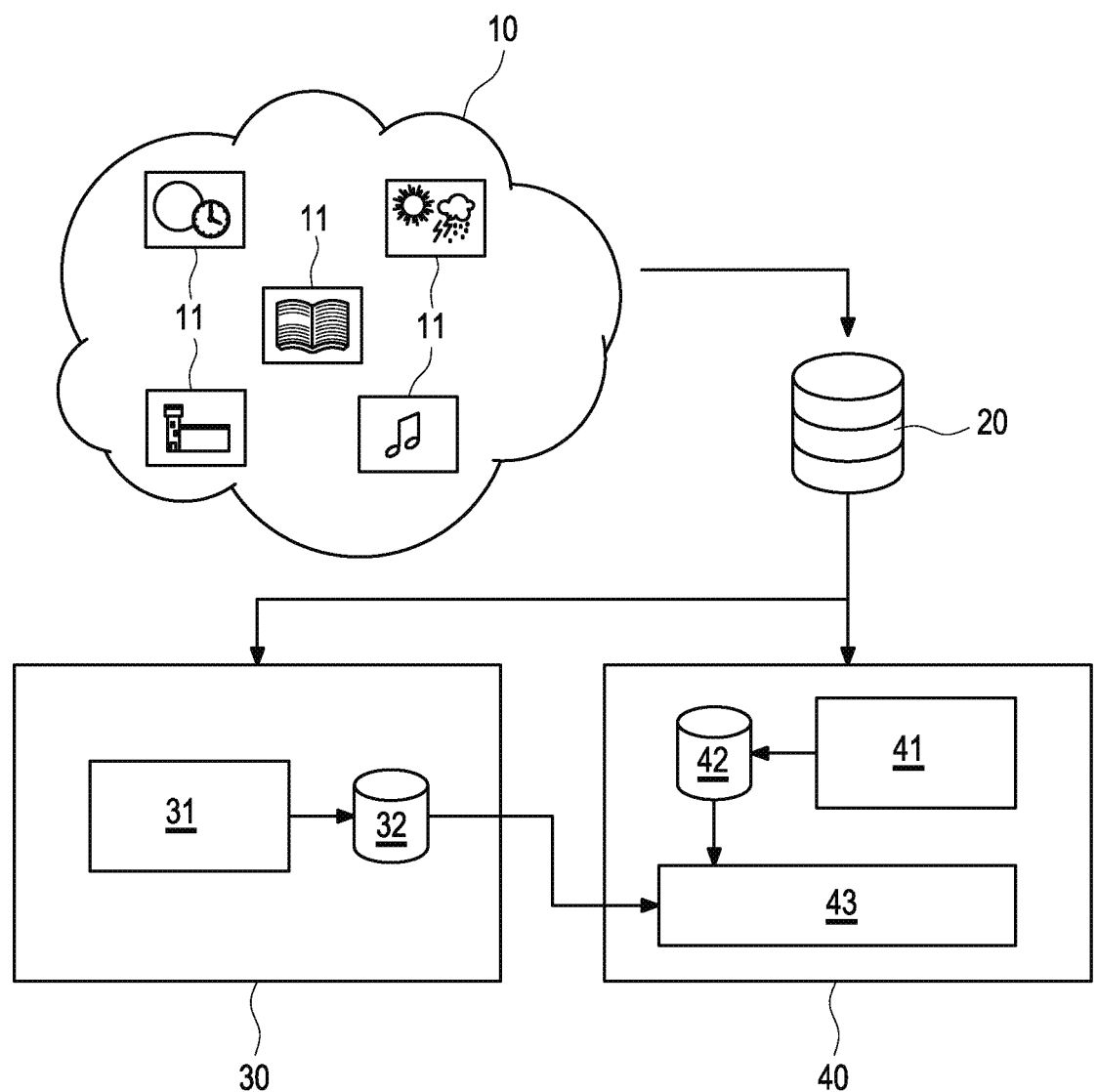

VOICE CONTROL FOR A VEHICLE

TECHNICAL FIELD

The present application refers to a human-machine interface (HMI) for a vehicle having a microphone for registering a command word spoken by a driver or a further occupant of the vehicle and a control unit, which has a speech recognition module (automatic speech recognition, ASR) for recognizing multiple specific command words.

BACKGROUND

A vehicle typically has multiple functional systems and a human-machine interface (HMI), by means of which a driver or a further occupant of the vehicle can actuate the multiple functional systems. A human-machine interface accordingly comprises a display device, on which operating elements associated with the functional systems, such as switches and controllers, are displayed, and an actuating means for switching on, switching off, and adjusting the multiple functional systems.

In consideration of the variety of functional systems, the operating elements associated therewith are usually arranged in a tree-type hierarchical menu structure for the sake of good comprehensibility and are accessible via corresponding menu entries of the menu structure. It follows therefrom for deep menu structures having multiple hierarchy levels that the actuating means is accordingly operated multiple times to actuate a specific functional system arranged in a deep hierarchy level.

To operate such a human-machine interface, the driver has to turn his view away from traffic events in surroundings of the vehicle and direct it to the display unit of the human-machine interface. In the case of a manual actuating means, the driver additionally has to remove a hand from a steering wheel of the vehicle to operate the actuating means. This results in a distraction of the driver, whereby the safety of the vehicle can be impaired. To enhance the safety and the operating comfort, human-machine interfaces for vehicles increasingly have a speech controller, which enables comfortable navigation through the menu structure without use of the hand.

DE 103 60 655 A1 discloses a human-machine interface for actuating functional systems of a vehicle. The human-machine interface comprises a hierarchical arrangement of menu entries which are associated with the functional systems of the vehicle, a display device, which has multiple display regions for displaying the menu entries, a manual actuating means for selecting a menu entry, and a speech recognition module, which recognizes specific spoken menu entries in dependence on a hierarchy level and the display region and selects a recognized menu entry.

In the case of a deep menu structure, accordingly multiple menu entries have to be spoken by the driver during a navigation through the menu structure, which can nonetheless distract the driver from the traffic events.

DE 10 2009 018 590 A1 discloses a human-machine interface for actuating functions of a vehicle. The human-machine interface comprises a hierarchical arrangement of menu entries which are associated with the functions of the vehicle, a display device, a manual actuating means for selecting a menu entry, and a speech recognition module having a specific vocabulary of spoken key words, which recognizes a key word within a spoken instruction and displays menu entries which are associated with the recognized key word in the display device in list form independently of the hierarchy level thereof.

In other words, the predefined hierarchical menu structure is flattened by means of predefined key words, whereby the operation of the human-machine interface is facilitated. However, the described speech recognition modules are each restricted to a specific predefined vocabulary of command words, which have to be used uniformly by all persons operating the human-machine interface. Moreover, the command words also have to be pronounced in a standardized form to a certain extent, i.e., clearly and unambiguously, in order to be recognized by the speech recognition module.

DE 10 2013 219 649 A1 discloses a human-machine interface, which can be personalized, for actuating functions of a vehicle. The human-machine interface comprises a microphone, a control unit having a speech recognition module for recognizing spoken command words, and a configurable mapping module, which comprises personalized associations between command words and functions of the vehicle. The mapping module is configured for a specific person by the specific person inputting spoken command words via the microphone and associating each of them with a function of the vehicle.

Conventional functional systems of a vehicle also comprise a so-called infotainment system, via which the driver and further occupants of the vehicle can access items of information and entertainment contents. For example, the infotainment system can allow an access to travel route data and traffic data and also to radio transmitters or pieces of music.

However, it is additionally desirable to access further online retrievable digital contents via the infotainment system of the vehicle. This aspect plays an increasingly important role above all in vehicles having at least partial self-driving functionality (autonomous driving). One special feature of the online retrievable digital contents is that they are updated continuously, i.e., they have strong change dynamics. The speech controllers of the described human-machine interfaces, in contrast, each relate to a static menu structure predefined by the functional systems of the vehicle, having a fixed number of menu entries, with which a corresponding number of command words is associated.

BRIEF DESCRIPTION OF DRAWINGS/FIGURES

FIG. 1 shows a schematic illustration of a flow chart of a method, in accordance with some embodiments.

DETAILED DESCRIPTION

The object of some embodiments of the present application is to provide a flexible human-machine interface, which enables speech-controlled access to an online retrievable digital content. In addition, the object of some embodiments of the present application is to specify a method for operating a corresponding speech controller for a human-machine interface.

In accordance with some embodiments, a human-machine interface for a vehicle, having a microphone for registering a command word spoken by a driver or a further occupant of the vehicle, and a control unit, which has a speech recognition module for recognizing multiple specific command words is disclosed. In this case, a command word is also recognized within a natural-language statement of the driver and the further occupant of the vehicle.

In accordance with some embodiments, the specific command words may comprise at least one keyword, which is associated with the digital content. In other words, the keyword is part of the set of the command words which are recognized by the speech recognition module and is thus equivalent in a technical aspect. This means that the control unit of the vehicle actuates a functional system of the vehicle when the speech recognition module has recognized a keyword.

In accordance with some embodiments, the at least one keyword is regularly and/or automatically updated. This means that the keywords associated with the command vocabulary of the speech recognition module can change in the course of time. A keyword can both be incorporated into the command vocabulary and also erased from the command vocabulary. A further aspect of the up-to-date nature of a keyword relates to the digital contents associated with this keyword. Multiple different digital contents can be associated with a specific keyword at one point in time. The digital contents associated with the specific keyword can change in the course of time.

In accordance with some embodiments, at least one keyword represents an abstraction of the associated digital content. It is not necessary for a keyword to be explicitly contained in an online retrievable digital content. Rather, the keyword can also abstractly describe an associated digital content, for example, in the meaning of a generic term (concept) or a category term.

In accordance with some embodiments, the control unit has a keywording module, which is configured to analyze a digital content and associate at least one keyword with the analyzed digital content. Using the keywording module, a digital content can be keyworded by the control unit, i.e., one or more keywords are associated with the digital content. The keywording module can execute corresponding algorithms, for example, eHITS or TermsNet, for the keywording of digital contents.

In yet other embodiments, the human-machine interface may comprise a display device and the control unit configured to retrieve online digital content associated with the at least one keyword and display it on the display device. When the human-machine interface has recognized a keyword, the control unit effectuates downloading and display of digital contents which are associated with this keyword. In this manner, digital content does not have to be permanently stored in the control unit.

In accordance with some embodiments, a method for operating a speech recognition module of a control unit of a vehicle, in particular by means of a human-machine interface is disclosed.

In accordance with some embodiments, at least one keyword, which is associated with a digital content, is added to multiple specific spoken command words, which are recognized by the speech recognition module. In accordance with some embodiments, the vocabulary of command words recognized by the speech recognition module is expanded by keywords, which each enable an access to associated online retrievable digital contents.

In accordance with some embodiments, the digital content is analyzed by a keywording module and at least one keyword is associated with the analyzed digital content by the keywording module. A keywording module can keyword a digital content completely automatically, i.e., associate one or multiple keywords with a digital content without personal cooperation. For this purpose, a special algorithm, for example, eHITS or TermsNet, is executed by the keywording module. Such algorithms are capable of also associating abstract keywords, which are not contained in the digital content, in addition to keywords which are contained in the digital content.

In accordance with some other embodiments, the digital content is loaded by a first server arranged outside the vehicle into the control unit of the vehicle and keyworded by the control unit. The keywording of the online retrievable digital content is performed by a keywording module stored in the control unit of the vehicle. In this embodiment, the keywording module can also be used to keyword digital contents which are not retrieved from an external first server, but rather are merely stored in the control unit of the vehicle.

In accordance with yet another embodiment, the digital content is keyworded by a second server (backend) arranged outside the vehicle and the at least one keyword associated with the digital content is transferred online into the control unit of the vehicle. In this variant, the keywording of an online retrievable digital content takes place centrally on an external second server outside the vehicle. In this manner, the associated keywords can be transferred into multiple vehicles and used by the drivers thereof and/or further occupants in the same manner in each case.

The features of the two above-mentioned embodiments can also advantageously be combined with one another, without leaving the scope of protection disclosed hereby.

In accordance with some embodiments, a digital content which is associated with the at least one keyword is retrieved online and displayed on a display device of the vehicle when the at least one keyword is recognized by the speech recognition module. In this manner, digital contents having to be stored and kept ready in the control unit of the vehicle is avoided.

FIG. 1 shows a schematic illustration of a flow chart of the method in accordance with some embodiments. A speech recognition module 43 of a control unit of a human-machine interface of a vehicle 40 is operated using the method. In this case, at least one keyword, which is associated with a digital content 11, is added to multiple specific spoken command words, which are recognized by the speech recognition module 43. In this manner, the vocabulary recognized by the speech recognition module 43 is expanded. The digital content 11 is retrieved in the Internet 10, for example, from a cloud accessible via the Internet 10.

The digital content 11 is loaded by a first server 20 arranged outside the vehicle 40 into the control unit of the vehicle 40 and keyworded by the control unit. In this case, the digital content 11 is analyzed by a keywording module 41 of the control unit. At least one keyword is associated with the analyzed digital content 11 by the keywording module 41 and stored in a storage unit 42 of the control unit. The digital content 11 loaded for the keywording can subsequently be erased in the control unit, i.e., only keywords and the associations thereof remain stored in the control unit.

Alternatively or additionally thereto, the digital content 11 is keyworded by a second server 30 (backend) arranged outside the vehicle 40. In this case, the digital content 11 is analyzed by a keywording module 31 and at least one keyword is associated with the analyzed digital content 11 by the keywording module 31 and stored in a storage unit 32 of the second server 30. The keyword associated with the at least one digital content 11 is then transferred online into the control unit of the vehicle 40.

When a stored keyword is recognized by the speech recognition module 43, the digital content 11 retrieved with the recognized keyword is retrieved online and displayed on a display device of the vehicle 40. If multiple digital contents 11 are associated with the recognized keyword, firstly a selection list of the multiple associated digital contents 11 is displayed.

A human-machine interface for a vehicle 40 is used to execute the described method. It comprises a microphone for registering a command word spoken by a driver or a further occupant of the vehicle 40 and a control unit, which has a speech recognition module 43 for recognizing multiple specific command words. The control unit moreover has a keywording module 41, which is configured to analyze a digital content 11 and associate at least one keyword with the analyzed digital content 11. Furthermore, the human-machine interface comprises a display device.

The specific command words comprise at least one regularly and automatically updated keyword, which is associated with the digital content 11, after the method in accordance with some of the embodiments is carried out. In this case, the at least one keyword can also represent an abstraction of the associated digital content 11, i.e., it can be a generic term or a category term.

The control unit is moreover configured to retrieve online a digital content 11 which is associated with the at least one keyword and display it on the display device.

One advantage of the method and the human-machine interface as disclosed above is that online retrievable digital contents can be conveniently loaded into a vehicle and used therein via a speech controller. This is achieved by an expansion of the recognizable vocabulary of command words of a speech recognition module by keywords, which are associated with the digital contents by means of automatic keywording.

LIST OF REFERENCE NUMERALS

10 Internet
11 digital content
20 first server
30 second server (backend)
31 keywording module
32 storage unit
40 vehicle
41 keywording module
42 storage unit
43 speech recognition module

The invention claimed is:

1. A human-machine interface for a vehicle comprising:
a microphone for registering a spoken command word; and
a control unit comprising a speech recognition module for recognizing the spoken command word as a keyword from a plurality of command words,
wherein the plurality of command words comprises at least one keyword associated with an online retrievable digital content, and
wherein the control unit further comprises a keywording module configured to analyze the online retrievable digital content for associating the at least one keyword with the analyzed online retrievable digital content.

2. The human-machine interface of claim 1, wherein the at least one keyword is updated regularly and/or automatically.

3. The human-machine interface of claim 1, wherein the at least one keyword represents an abstraction of the associated online retrievable digital content.

4. The human-machine interface of claim 1, further comprising:
a display device, and
wherein the control unit is further configured to retrieve and display the online retrievable digital content on the display device.

5. A method for operating a speech recognition module of a control unit of a human-machine interface of a vehicle, comprising:
adding at least one keyword to a plurality of command words, wherein the plurality of command words comprises the at least one keyword associated with an online retrievable digital content;
recognizing, at a speech recognition module, the at least one keyword and
analyzing, at a keywording module of the control unit, the online retrievable digital content for associating the at least one keyword with the analyzed online retrievable digital content, wherein the at least one keyword is a spoken command word.

6. The method of claim 5, further comprising:
loading, from a first server situated outside the vehicle into the control unit, the online retrievable digital content; and
keywording, at the control unit, the online retrievable digital content loaded from the first server into the control unit.

7. The method of claim 6, wherein the online retrievable digital content is keyworded by a second server situated outside the vehicle, and wherein the at least one keyword associated with the online retrievable digital content is transferred online into the control unit.

8. The method of claim 6, further comprising, in response to recognizing the at least one keyword at a speech recognition module, retrieving and displaying the online retrievable digital content associated with the at least one keyword.

9. The method of claim 5, wherein the at least one keyword abstractly describes the analyzed online retrievable digital content.

* * * * *